United States Patent
Vija et al.

(10) Patent No.: US 11,250,545 B2
(45) Date of Patent: Feb. 15, 2022

(54) DEEP LEARNING-BASED DENOISING IN QUANTITATIVE SINGLE PHOTON EMISSION COMPUTED TOMOGRAPHY

(71) Applicant: Siemens Medical Solutions USA, Inc., Malvern, PA (US)

(72) Inventors: Alexander Hans Vija, Evanston, IL (US); Michal Cachovan, Baiersdorf (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 94 days.

(21) Appl. No.: 16/564,242

(22) Filed: Sep. 9, 2019

(65) Prior Publication Data

US 2021/0073950 A1   Mar. 11, 2021

(51) Int. Cl.
*G06T 5/00* (2006.01)
*G06N 20/00* (2019.01)

(52) U.S. Cl.
CPC ............. *G06T 5/002* (2013.01); *G06N 20/00* (2019.01); *G06T 2207/10108* (2013.01)

(58) Field of Classification Search
CPC .......... G06T 5/002; G06T 2207/10108; G06N 20/00
See application file for complete search history.

(56) References Cited

U.S. PATENT DOCUMENTS 8,483,460 B2   7/2013  Malmin
2019/0108441 A1*  4/2019  Thibault .............. G01N 23/046

FOREIGN PATENT DOCUMENTS

WO    WO-2016166199 A1 * 10/2016  .......... G06T 1/0007

OTHER PUBLICATIONS

Felix Nensa, et al. "Artificial Intelligence in Nuclear Medicine" The Journal Of Nuclear Medicine. vol. 60 No. 9. Sep. 2019. pp. 29S-37S.
Mathieu Hatt, et al. "Radiomics: Data Are Also Images" The Journal Of Nuclear Medicine. vol. 60 No. 9. Sep. 2019. pp. 38S-44S.

* cited by examiner

Primary Examiner — Ping Y Hsieh
Assistant Examiner — Xiao Liu

(57) ABSTRACT

For denoising in SPECT, such as qSPECT, machine learning is used to relate settings to noise structure. Given the SPECT imaging arrangement for a patient, the machine-learned model estimates the structure of the noise. This noise structure may be used to denoise the reconstructed representation.

18 Claims, 3 Drawing Sheets

DEEP LEARNING-BASED DENOISING IN QUANTITATIVE SINGLE PHOTON EMISSION COMPUTED TOMOGRAPHY

BACKGROUND

The present embodiments relate to single photon emission computed tomography (SPECT). SPECT imaging uses a radioisotope or radiotracer to determine physiological function within a patient. A spatial distribution of the radioisotope is imaged for qualitative SPECT based on counts of emissions. For quantitative SPECT (qSPECT), the activity concentration or specific uptake of the radiotracer by tissues in the body is measured. The activity concentration (i.e., the concentration of the radiotracer from different locations) is reconstructed from detected emissions.

There are many sources of noise in SPECT. Statistical and system sources of noise result in inaccuracy in qSPECT. Noise may be difficult to identify and remove due to the difficulty in distinguishing between the noise and signal. It is difficult to model noise due to the various SPECT imaging arrangements and sources of noise. For example, reconstruction may be a non-linear process so that noise in detection is converted from an expected statistical distribution into other distributions.

SUMMARY

By way of introduction, the preferred embodiments described below include methods, systems, and non-transitory computer readable media for denoising in SPECT, such as qSPECT. Machine learning is used to relate settings to noise structure. Given the SPECT imaging arrangement for a patient, the machine-learned model estimates the structure of the noise. This noise structure may be used to denoise the reconstructed representation.

In a first aspect, a method is provided for denoising in a quantitative single photon emission computed tomography (SPECT) system. The SPECT system configured with first settings detects emissions from a patient. Second settings are used to reconstruct a representation in object space from the emissions. Input of the first and/or second settings to a machine-learned model determines a noise structure. The noise in the representation is reduced using the noise structure. An image of the noise-reduced representation is generated.

In one embodiment, the first settings are for a collimator, isotope, scan protocol, and type of SPECT system, and the second settings are for type of reconstruction, model, and compensation technique. Both the first and second settings are input to the machine-learned model to determine the noise structure. In one example, the type of reconstruction is iterative reconstruction, so the second settings are a number of iterations or a stop criterion.

In an embodiment, the machine-learned model was trained with deep learning. A neural network is trained to output the noise structure.

In other embodiments, the noise structure is determined as a parameterization of size, shape, and/or intensity of noise. The values of a noise model are determined as the noise structure.

According to one embodiment, the noise is reduced by identifying the noise by similarity to the noise structure and reducing or eliminating the identified noise. In another embodiment, reducing the noise includes filtering with filter parameters set based on the noise structure.

Various types of SPECT images may be generated. For example, a quantitative SPECT image of a quantity representing activity concentration is generated.

In a second aspect, a single photon emission computed tomography (SPECT) system is provided. A detector is configured for detecting emissions from an isotope in a patient. An image processor is configured to reconstruct a spatial distribution of the emissions, identify features of noise from a deep machine-learned network, and locate noise in the spatial distribution of emissions from the features of noise. A display is configured to display an image from the spatial distribution of the emissions. The image being a function of the located noise, such as highlighting signal and not noise regions.

In one embodiment, a collimator is adjacent to the detector. The image processor is configured to identify the features of the noise from information for the isotope, the collimator, and the reconstruction. The information is input to the deep machine-learned network.

The image processor may be configured to identify the features of the noise as a shape, size, and/or intensity according to one embodiment. In another embodiment, the image processor is configured to identify the features of the noise by input of characteristics of the SPECT system and/or isotope characteristics to the machine-learned network.

In a further embodiment, the image processor is configured to reduce the located noise. The image is a quantitative SPECT image of the spatial distribution of the emissions with the located noise being reduced.

In a third aspect, a method is provided for deep learning for denoising in quantitative single photon emission computed tomography (SPECT) imaging. Training data of samples of different arrangements for SPECT imaging is generated. The training data includes noise shapes. Deep learning machine trains a network to output noise shape information from input of the arrangements. The machine-learned network is stored.

In various embodiments, the training data are generated by SPECT imaging of phantoms and/or physics simulation. The training data are generated with the different arrangements including different isotopes, collimator characteristics, types of SPECT systems, scan protocols, reconstruction approaches, reconstruction models, and/or reconstruction compensations.

In one embodiment, the network is machine trained to output a shape, size, and/or intensity of noise as the noise shape information.

In another embodiment, a reconstruction for a patient is denoised based on the noise shape information output by the machine-learned network in response to input of a patient scan arrangement for the SPECT imaging of the patient.

The present invention is defined by the following claims, and nothing in this section should be taken as a limitation on those claims. Features, embodiments, or aspects of one type of claim (e.g., method or system) may be used in another type of claim (e.g., system or method). Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The noise structure of SPECT reconstructions is difficult and dependent on many variables from the isotope, SPECT system, scan protocol, and reconstruction method and its models and compensation techniques. Deep learning is used to train a model to find characteristic features and classify noise in reconstructed representations.

Figure 1:
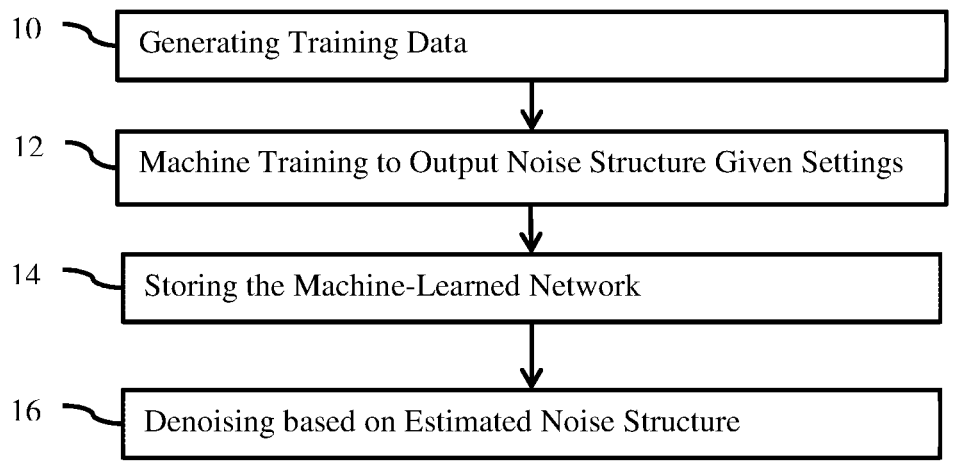
FIG. 1 is a flow chart diagram of one embodiment of a method for machine training for denoising in qSPECT or other SPECT imaging.

FIG. 1 shows one embodiment of a method for deep learning for denoising in qualitative SPECT or qSPECT. Machine learning trains a network to predict the noise structure given various variables for SPECT. This noise structure may be used to identify noise in and/or denoise a reconstruction.

Figure 4:
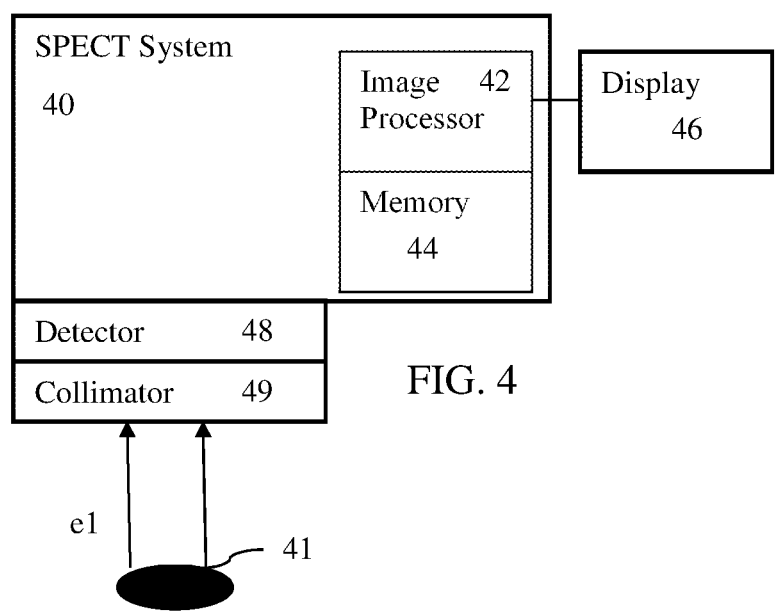
FIG. 4 is a block diagram of a system, according to one embodiment, for SPECT imaging with machine-learned model-based noise identification.

The acts are performed by the system of FIG. 4 or a different system. For example, a server, workstation, computer, or other processor performs the machine training and uses a memory to store the machine-learned network. The same or different processor and/or SPECT system are used to generate the training data. The same or different SPECT system may use the machine-learned network, such as for denoising. Other devices may perform any of the acts.

Additional, different, or fewer acts may be performed. For example, act 16 is not provided. As another example, act 10 is not provided where the training data is previously collected or generated. In yet another example, acts related to configuring an architecture of the network for machine training are provided. The acts are performed in the order shown or a different order.

In act 10, training data is generated. In one approach, the training data is generated by SPECT scanning or imaging. Phantoms are scanned with different arrangements of qSPECT or other SPECT imaging.

In another approach, physics simulation is used. The qSPECT or SPECT imaging is simulated. Different arrangements of qSPECT or other SPECT imaging are modeled. The simulation may include addition of noise from one or more sources.

The training data includes tens, hundreds, or thousands of samples. Each sample includes input data and ground truth data. The machine training learns from the samples to estimate an output from the input. The ground truth data are the actual output given the input. By comparing estimates output by the machine-learned network given the input to the ground truth, the machine learning alters the network to best predict the output given an unseen input.

The input feature vector for the samples are values reflecting different arrangements. The values are variables used in SPECT imaging. Any parameterization of the SPECT imaging may be used. For example, the samples are of settings for SPECT imaging. The settings are of user or programming-based settings and/or characteristics of selections or the arrangement. Any setting or arrangement characteristics that influences noise is used. All or a sub-set of such settings are used as the input vector.

Figure 2:
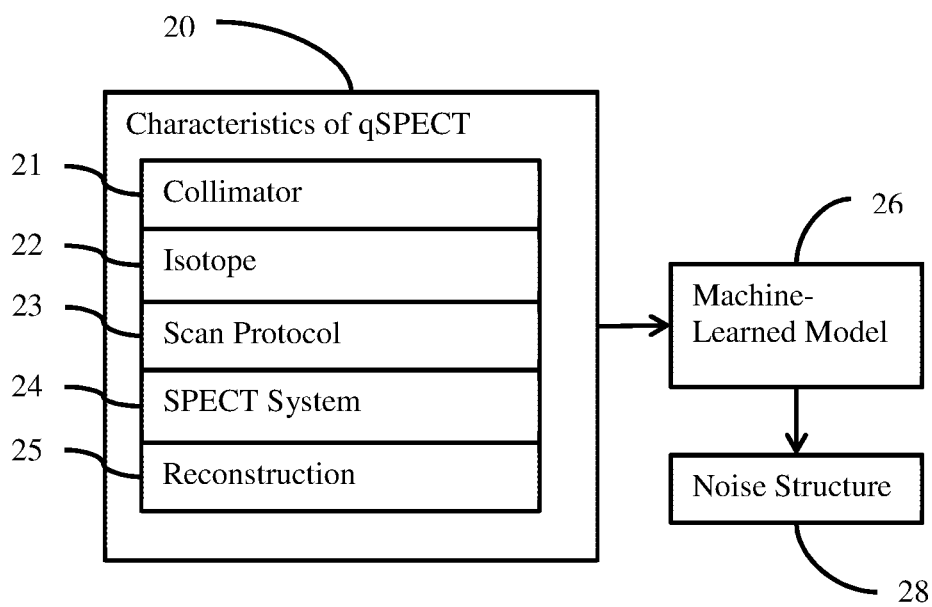
FIG. 2 illustrates characteristics of SPECT to be used for estimating the noise structure by a machine-learned model.

In one embodiment, the different arrangements include different isotopes, collimator characteristics, types of SPECT systems, scan protocols, reconstruction approaches, reconstruction models, and/or reconstruction compensations. FIG. 2 shows an example where characteristics of the qSPECT include collimator characteristics 21, isotope characteristics 22, scan protocol characteristics 23, SPECT system characteristics 24, and reconstruction characteristics 25. Different samples are associated with differences in one or more characteristics contributing to noise. Some samples may be for the same arrangements. Some samples are for different arrangements.

Isotope characteristics include the selected isotope, energy, dose, how the isotope is administered, and/or volume. Collimator characteristics include material (e.g., lead), thickness, point spread function, hole angulation map, or shape (e.g., collimation settings or plate arrangement). The types of SPECT systems include the manufacturer, model (e.g., dual or single camera), or other division of SPECT systems. The scan protocols include dwell time, movement, range of motion of the camera, part of the body being scanned, energy thresholds, or another scan characteristic. The reconstruction approaches are the method of reconstruction, such as Maximum Likelihood Expectation Maximization (ML-EM), Ordered Subset Expectation Maximization (OSEM), Conjugate Gradient (CG), penalized weighted least squares (PWLS), Maximum A Posteriori (MAP), multi-modal reconstruction, non-negative least squares (NNLS), or another approach. Characteristics of the reconstruction approach may be included, such as the number of iterations and/or stop criterion. The reconstruction models include the image formation model, often characterized by a point spread function of a specific collimator, the system representation including detector position, and emissions. The reconstruction compensations include compensation for patient motion, scatter and attenuation, motion compensation settings and/or calibration settings. In another embodiment, the characteristics of the reconstruction include system model information (e.g., calibrations, uniformity, peaking, detector position, gating, and point spread function) and compensation (e.g., compensation for motion, scatter, and attenuation).

For each sample and corresponding input vector, a model of noise resulting from the arrangement is provided. Using imaging or scans of phantoms, the emission distribution (e.g., uniform) is known. The intensities of the known emission distribution are subtracted from the intensities of the measured or image distribution. The result is the noise. Using simulation, the simulation outputs an emission distribution of intensities. Since the noise is added, the emission distribution output by the simulation includes signal and noise information. The signal information known from the simulation is subtracted, resulting in intensities for the noise distribution.

A noise model is applied to the noise information. Depending on the arrangement, the noise has different structure. The noise structure is a multi-pixel or voxel artifact. For example, the noise structure is a streak, donut, oblong, or other shape. The noise structure may have different intensity and/or intensity distribution. The noise structure may have different sizes. The noise structure may have different spatial frequency of occurrence and/or directions. For each sample, the noise model is fit to the noise to identify the noise structure or structures resulting form the arrangement. Any parameterization of the noise structure may be used. Alternatively, the noise structure is used as a whole (e.g., template).

The values of the parameters of the noise model for the noise resulting from the arrangement of the sample are provided as the ground truth. Alternatively or additionally, a template or specific structure is identified as the ground truth. In one embodiment, the shape, size, and intensity of the noise are parameterized. For repeating or spatially distributed noise, a frequency or other characteristic may be used to represent the noise structure. For intensity, a lack of information (e.g., a hole) may indicate noise.

The training data includes the ground truth as the values of the parameters of the noise model and/or actual templates of the noise. For different samples and corresponding arrangements, different values for the noise parameters may result.

In act 12, a machine (e.g., processor) trains a network to output noise shape or structure information from input of the arrangements. The network includes learnable parameters, the values of which are determined in machine training to output noise shape information (e.g., noise structure such as values of parameters of a noise model) from an input arrangement. For example, the machine training determines the values of the learnable parameters (e.g., weights, connections, filter kernels, pooling, . . . ) that estimate the shape, size, and/or intensity of noise given a specific or unseen arrangement (e.g., values of characteristics for the SPECT scanning and reconstruction).

In one embodiment, deep learning is used. A neural network (e.g., deep learning) arrangement is defined. The definition is by configuration or programming of the learning. The number of layers or units, type of learning, and other characteristics of the network are controlled by the programmer or user. In other embodiments, one or more aspects (e.g., number of nodes, number of layers or units, or type of learning) are defined and selected by the machine during the learning.

Deep architectures include convolutional neural network (CNN) or deep belief nets (DBN), but other deep networks may be used. CNN learns feed-forward mapping functions while DBN learns a generative model of data. In addition, CNN uses shared weights for all local regions while DBN is a fully connected network (i.e., having different weights for all regions of an image). The training of CNN is entirely discriminative through back-propagation. DBN, on the other hand, employs layer-wise unsupervised training (e.g., pre-training) followed by the discriminative refinement with back-propagation if necessary. In one embodiment, a CNN, such as a fully convolutional neural network, is used.

The neural network is defined as a plurality of sequential feature units or layers. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous or subsequent layer or unit. Skip connections bypassing one or more layers may be used.

Rather than pre-programming the features and trying to relate the features to the output, the deep architecture is defined to learn the features at different levels of abstraction through deep learning. The features are learned to reconstruct lower level features (i.e., features at a more abstract or compressed level). Each node of the unit represents a feature. Different units are provided for learning different features.

Within a unit or layer, any number of nodes is provided. For example, 100 nodes are provided. A different number of nodes may be provided for different units or layers. Later or subsequent units may have more, fewer, or the same number of nodes. The features of the nodes are learned by the machine using any building blocks. For example, auto-encoder (AE) or restricted Boltzmann machine (RBM) approaches are used. Training of AE or RBM is prone to over-fitting for high-dimensional input data. Sparsity or denoising techniques (e.g., sparse denoising AE (SDAE)) are employed to constrain the freedom of parameters and force learning of interesting structures within the data. Enforcing sparsity within hidden layers (i.e., only a small number of units in hidden layers are activated at one time) may also regularize the network. In other embodiments, at least one unit is a convolution with ReLU activation or is a batch normalization with a ReLU activation followed by a convolution layer (BN+LeakyRU+convolution). Different units may be of the same or different type.

Any neural network architecture may be used, such as an image-to-image or generative network. The architecture is the arrangement of layers for the network. In one embodiment for registration, a convolutional-transposed-convolutional network is used. One segment of layers or units applies convolution to increase abstractness or compression. The most abstract feature values are then output to another segment. The other segment of layers or units then applies transposed-convolution to decrease abstractness or compression, resulting in outputting of an image or multi-channel data. In a further embodiment, the neural network is a U-net. An encoder (convolutional) and decoder (transposed-convolutional) network forms a "U" shape with one vertical being encoding, another vertical being decoding, and the connection between being passing features at a greatest level of compression or abstractness from the encoder to the decoder. Other fully convolutional networks may be used. The U-net may include skip connections, such as passing values for features at any level of abstraction from the encoder to the corresponding level of the decoder.

In other embodiments, a DenseNet is used. Any arrangement of layers relating input information to the output may be used. A multi-channel input (e.g., one channel for each characteristic of the arrangement) and a multi-channel output (e.g., one channel for each parameter of the noise model) with any number of intervening layers is provided. In other embodiments, the output is a spatial representation of the noise structure, such as using the generative, image-to-image, or U-Net arrangements.

The machine (e.g., image processor) trains the defined neural network arrangement. The training data samples and ground truths are used to train the neural network. One network is trained to output the noise structure. Alternatively, different networks are trained to output values for different parameters, such as one network for size, another network for shape, and a third network for intensity or intensity distribution.

In training, the similarity of the estimated noise structure (e.g., values of noise model parameters) to the ground truth is minimized. For example, the neural network is trained as a standard regression problem with the sum-of-squared differences loss. Other loss functions, such as L1 or L2, may be used. Any optimization may be used, such as Adam, RMSprop optimizer, or SGD. Batch normalization, dropout, and data augmentation may be used. During the optimization, the different distinguishing features of the input data (e.g., qSPECT arrangement) are learned. The features providing an indication of noise structure are learned.

In act 14, the machine outputs a trained neural network, such as the machine-learned model 26 of FIG. 2. The machine-learned network incorporates the deep learned features for the various units and/or layers of the network. The values for the learnable parameters of the architecture result from training. The architecture and the values of the learnable parameters are output as the machine-learned network or model.

Once trained, a matrix, kernels (e.g., learned convolution weights), or other trained network is output. The data represents the trained architecture. The machine-learned network includes definitions of convolution kernels and/or other characteristics of the neural network trained to determine noise structure from an input arrangement.

The machine-learned network is output to a computer network or memory. For example, the neural network as trained is stored in a memory for transfer and/or later application.

Using the learned features, the machine-learned network may estimate the noise structure for any arrangement for SPECT imaging. Once the network is trained, the network may be applied.

In act 16, the machine-learned network is applied. In reference to FIG. 2, the arrangement for SPECT imaging of a patient (e.g., the settings and/or other characteristics for scanning and reconstruction) is input to the machine-learned network 26, which outputs the noise structure 28. The noise structure is then used to denoise a reconstruction of the emissions from the patient in the SPECT imaging. The noise shape information output by the machine-learned network in response to input of a patient scan arrangement for the SPECT imaging of the patient is used to identify and remove noise. For example, structures in the reconstruction sized, shaped, and with intensity similar to noise resulting from the arrangement is removed or reduced, leaving signal that has different size, shape, or intensity response. The denoising is arrangement specific since different arrangements result in different noise structure.

Figure 3:
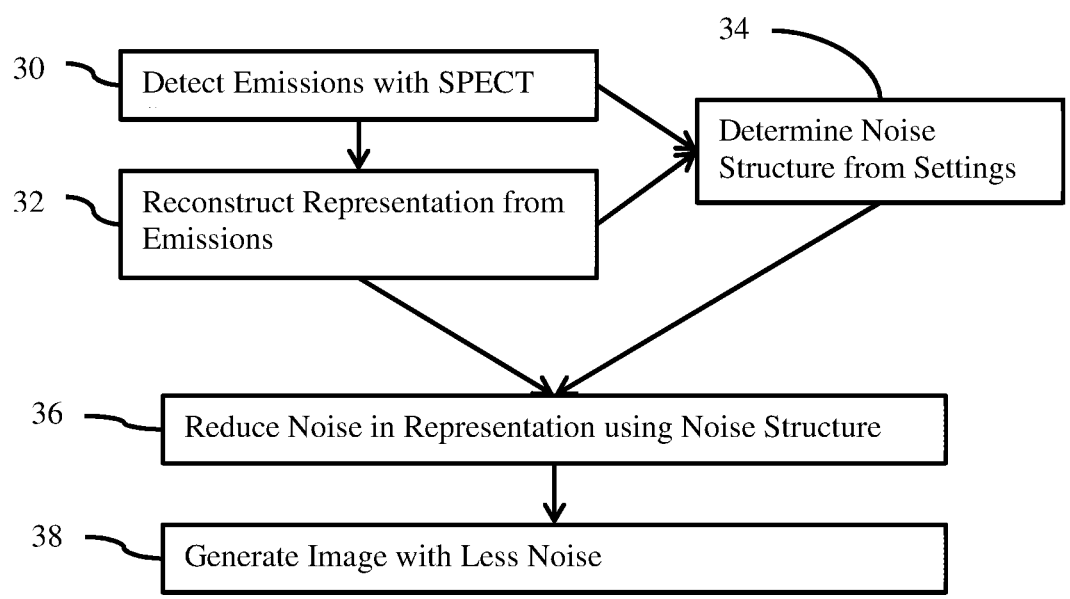
FIG. 3 is a flow chart diagram of one embodiment of a method for denoising with a machine-learned model in SPECT.

FIG. 3 shows one embodiment of a method for denoising in a qSPECT or qualitative SPECT system. A machine-learned model is used to estimate the noise structure based on the SPECT arrangement to scan and reconstruct for a given patient. This estimated noise structure is provided using the knowledge base from machine learning. The estimated noise structure is used to reduce noise in the method of FIG. 3 but may be used to identify noise or signal without denoising in other embodiments.

The method is applied for a given scan of a given patient. The patient includes a radiotracer with an isotope emitting energy. The emissions are collimated and detected using a scan protocol and used in reconstruction. The scanning and/or reconstruction result in noise having particular structure. To avoid or limit errors in calculation of activity concentration or uptake values, the noise is reduced. The SPECT system performs qSPECT with noise reduction or identification based on noise structure estimated by the machine-learned model for the patient imaging.

The acts are performed by the system of FIG. 4 or a different system. A detector, such as a gamma camera, detects emissions in act 30. A processor, such as a SPECT system computer, reconstructs in act 32, determines noise structure from settings in act 34, and reduces noise in act 36. The processor or a graphics-processing unit generates an image in act 38. Other devices may perform any of the acts.

Additional, different, or fewer acts may be performed. For example, act 30 is not provided where the detected emissions are stored or transferred from memory. As another example, act 38 is not provided where the reconstructed object is used for purposes other than imaging, such as to calculate a quantity. In yet another example, act 36 is not provided where the noise structure is used to identify noise or distinguish noise from signal without reducing the noise. In other examples, acts related to positioning the patient, configuring the SPECT scanner, rotating the detector about the patient, and/or SPECT imaging are provided. The acts are performed in the order shown or a different order.

In act 30, the SPECT system detects emissions from a patient. The activity concentration in a patient having received a radiotracer is determined as part of reconstruction by a qSPECT system. After administering (e.g., ingesting or injecting) the radiotracer into the patient, the patient is positioned relative to a SPECT detector, and/or the SPECT detector is positioned relative to the patient. Emissions from the radiotracer within the patient are detected over time. A collimator in front of the detector limits the direction of photons detected by the SPECT detector, so each detected emission is associated with an energy and line or cone of possible locations from which the emission occurred. A collimator may not be provided in other embodiments. The lateral position of the line or cone relative to the detector may likewise be determined. The SPECT detector may be rotated or moved relative to the patient, allowing detection of emissions from different angles and/or locations in the patient.

The SPECT detector is a gamma camera. For example, the detector includes photomultiplier tubes or solid-state photon detectors layered with a scintillation crystal. The sensors are arranged along a rectangular or other grid to provide a two-dimensional planar array for detecting gamma radiation.

The detection or scanning of the patient is performed with the SPECT system configured with settings. The settings for variables in scanning are provided as defaults, application specific protocol, and/or user input. The settings include characteristics of selections, such as the isotope, collimator, and/or SPECT system being used. The settings may be variables configured for scanning a patient and/or variables representing the available equipment being used to scan. In one embodiment, the settings for detection include characteristics of a collimator, isotope, scan protocol, and type of SPECT system.

In act 32, an image processor, such as an image processor of the SPECT system, performs reconstruction using the acquired projection data. The projection data represents the detected emissions. A processor of the SPECT system reconstructs the image or object that represents the emission distribution in the patient. The quantity or amount of uptake for each location (e.g., voxel) may be estimated as part of the reconstruction. The SPECT imaging system estimates the activity concentration of an injected radiopharmaceutical or tracer for the different locations. In quantitative SPECT, the goal is to estimate the activity concentration in kBq/ml of the tracer (i.e., isotope) that was injected into and distributed within the patient.

Any now known or later developed reconstruction methods may be used, such as based on Maximum Likelihood Expectation Maximization (ML-EM), Ordered Subset Expectation Maximization (OSEM), penalized weighted least squares (PWLS), Maximum A Posteriori (MAP), multi-modal reconstruction, non-negative least squares (NNLS), or another approach. Any models and/or compensation (e.g., motion compensation) may be used in the reconstruction.

The reconstruction is iterative. The iterative reconstruction forward projects a current estimate of the volume or image (e.g., object space) to projection space using forward projectors representing the detection. Since the detected emissions are in a projection space (e.g., generally known location in two-dimensions but not three), the forward projection of the current volume is compared to the detected or measured emissions. This comparison is tested for accuracy with a merit function (e.g., ML-EM or NNLS). If sufficiently accurate and/or having no further increase in accuracy, the iteration ceases, and the current volume is output as the reconstructed volume. If the merit function indicates insufficient or improving accuracy, a difference between the forward projection and the detected emissions is backward projected. This backward projection provides a gradient or change for the volume. The direction and step size are determined for the change and applied to update the volume. The process is then repeated for another iteration of the reconstruction.

The reconstruction is performed as configured by one or more settings. For example, the type of reconstruction, models and/or compensation in reconstruction are set by the user, defaults, or as part of a selected application. The settings of variables (e.g., number of iterations and/or stop criterion) and of characteristics of reconstruction control the reconstruction of the volume or plane from the emissions.

The reconstruction and/or scanning may introduce and/or distort noise. The noise is different for different settings (e.g., different scanning and/or different reconstruction). In act 34, a noise structure is determined. A machine-learned model determines the noise structure. The scan and/or reconstruction settings are input to the machine-learned model, which outputs the noise structure in response to the input.

The machine-learned model was trained with deep learning or other machine learning to estimate the noise structure. Given the arrangement used for scanning and/or reconstruction, the machine-learned model is trained to output the expected characteristics of noise.

The noise structure is output as a shape of a given size and intensity. Alternatively, the noise structure is output as values of parameters of a noise model. The noise model generates a representation of the noise based on the parameters, such as shape, size, and/or intensity parameters. Any characterization of the noise may be used.

In alternative embodiments, the machine-learned model is trained with reconstructed representations as input with or instead of the arrangement. The noise structure may be output based on, at least in part, the reconstructed volume.

A given arrangement may produce a particular type of noise. Alternatively, a given arrangement produces multiple types of noise. The machine-learned model may output the noise structure of one or multiple types. The noise structure or structures may be parameterized as a combination of types of noise.

The output noise structure may be used to identify noise or distinguish noise from signal. For example, groups of voxels or pixels representing a particular shape (e.g., oval) of a particular size (e.g., 3 mm×5 mm) and particular intensity (e.g., 60 in a 128-level dynamic range) indicates noise. Ovals of different size and/or intensity, the same size of different shapes and/or intensity, and/or regions of the same intensity of different shapes and/or sizes are likely from signal, so not identified as noise. Ranges may be used, such as assign a tolerance to an output value or by output by the machine-learned model of the range (e.g., average intensity of 40-80). Other characteristics, such as spatial frequency of repetition and/or direction, may be used for the noise structure.

In one example, a particular reconstruction may result in statistical noise being converted into a streak artifact. Systematic noise sources may not contribute much noise relatively. The machine-learned model outputs parameters of the expected streak (e.g., size in length and width and shape in as linear in a given direction) for the statistical noise resulting from iterative reconstruction.

In act 36, the image processor reduces noise in the reconstructed representation using the noise structure. The reconstructed volume represents the emissions from the patient as distributed in two or more spatial dimensions. This reconstructed representation of the patient and/or isotope in the patient includes noise. Based on the arrangement used for scanning and/or reconstruction, the noise has an expected structure.

The noise may be identified by the noise structure. The noise structure estimated by the machine-learned model in act 34 is used to identify the noise in the representation. Any region having the same or similar structure is identified as noise. The identified regions are removed. Alternatively, the identified regions are reduced or increased (e.g., noise as a lack of signal) in intensity. The reconstructed object is searched for all instances of the noise structure for removal.

In alternative embodiments, the noise is identified but not removed. The noise may be highlighted or indicated as possible noise based on the noise structure without removal or reduction. Alternatively, the signal is highlighted, and noise structure is not.

Other reduction may be used. For example, the noise structure is used to define a filter kernel. The filter kernel is shaped and sized based on the noise structure. By filtering the representation, any regions of similar shape and size are altered in intensity by filtering with the kernel. Any directional filtering may be used.

In act 38, the image processor generates an image of the noise-reduced representation. For example, a qSPECT image of a quantity representing activity concentration or uptake is generated. Due to the noise reduction, the image more likely shows emissions or signal. In alternative embodiments, the image is highlighted or annotated to distinguish noise from signal. Rather than reduction, the noise structure is used for identifying noise, which may remain and be in the image.

Once the reconstruction and denoising is complete, an image is generated. An image of the patient or part of the patient is generated from the reconstruction or representation. The results of the reconstruction represent a distribution of emissions or counts of emissions in three-dimensions. For qualitative SPECT, this distribution is used to generate an image. For qSPECT, the activity concentration for each location (e.g., voxel) is determined. The reconstruction provides voxel values representing activity concentration. The activity concentration in a patient having received the radiotracer is determined as part of reconstruction by the functional imaging system. In qSPECT, the goal is to estimate the activity concentration in kBq/ml of the tracer (i.e., isotope) that was injected into and distributed within the patient. The projection operators include calibration information, and the detector sensitivity, such as the system specific sensitivity to the liquid radiotracer used in the patient.

After reconstruction, specific uptake values (SUVs) may be calculated by the processor. The activity concentration of the reconstruction represents the amount of uptake at each location. This amount of uptake is a measure of emitted radiation, so is not normalized for the radiation dose provided to the patient. As a result, comparing uptake from different times may not be useful unless the same dose is provided. By calculating the SUV, uptake normalized for dose is provided, allowing comparison of different measures.

The SUV for each location or for some of the locations is calculated. The SUV is a function of the activity concentration for that location and the dose. The activity concentration is divided by the injected dose value. Other functions may be used. For example, the SUV may be a function of the body mass or other physical characteristic of the patient. The uptake magnitude represented in the activity concentration is normalized for both dose and body mass.

An image is generated from the reconstructed object (e.g., whole patient or part of the patient). In one embodiment, data for one or more (e.g., multi-planar reconstruction) planes is extracted (e.g., selected and/or interpolated) from a volume or voxels and used to generate a two-dimensional image or images. In another embodiment, a three-dimensional rendering is performed. Projection or surface rendering is used to create a representation of the volume or part of the patient from a given viewing direction on the two-dimensional screen.

The image is a qSPECT and/or qualitative SPECT image. Any qSPECT imaging may be provided, such as providing an image where the user may determine a value for activity concentration for any selected location represented in the image. The image may include a number, text, graph, chart, or other representation of specific uptake and/or activity concentration quantities for one or more locations. Alternatively, the image is a qualitative SPECT image that indicates relative activity concentration distribution in the patient. The image has less noise or identified noise due to the estimated noise structure, so may be more diagnostically useful than without estimation of the noise structure.

Any SPECT image may be displayed alone, adjacent to a computed tomography (CT) image, or overlaid on a CT image (e.g., color for SPECT and grayscale for computed tomography). Multi-modality images with magnetic resonance, ultrasound, x-ray, or other modalities may be used.

The denoising may benefit qualitative SPECT or qSPECT applications, such as lesion detection and characterization or uptake analysis. Deep learning can learn efficiently the nuances of the application and without sacrificing (up to an extent) the goal. By merely smoothing, resolution, in some cases lesion detection ability, and/or higher moments in uptake distribution. The deep learning may better balance the trade-off.

Clinically, the noise reduction is to increase the detection performance and characterization of either a HOT or a COLD lesion in a "warm" background (i.e. finite contrast). Detection performance may be numerically characterized by an ROC analysis. The Area-under-Curve yields the performance of the observer for the particular image problem (i.e., detection of lesion of a specific size with specified contrast). The higher the noise, the larger the object, and/or the larger the contrast has to be to maintain the same detection performance. In other words, lowering the noise allows for detection of smaller lesions and/or at lower contrast.

In the qSPECT, it is easier as qSPECT quantifies the uptake in Bq/ml. In this case, noise reduction does not change the estimated uptake mean averaged ($1^{th}$ moment) over a specific region of interest, but it changes the variance and higher moments (e.g. used in characterization tasks, such as In Radiomics).

FIG. 4 shows a system for SPECT imaging, such as qSPECT imaging. The system is a quantitative or qualitative SPECT system. The system implements the method of FIG. 3 or another method.

The system includes an SPECT system 40, an image processor 42, a memory 44, and a display 46. The image processor 42, memory 44, and/or display 46 are part of the SPECT system 40 or are separate (e.g., a computer or workstation). Additional, different, or fewer components may be provided. For example, the system is a computer without the SPECT system 40. As another example, user input, patient bed, or other SPECT related devices are provided. Other parts of the system may include power supplies, communications systems, and user interface systems.

The SPECT system 40 includes a detector 48 and a collimator 49. Other components may be provided. Any now known or later developed SPECT system 40 may be used.

The detector 48 is a gamma camera connected with a gantry. The gamma camera is a planar photon detector, such as having crystals or scintillators with photomultiplier tubes or another optical detector. The gantry rotates the gamma camera about the patient. During scanning of a patient, emission events are detected with the camera at different positions or angles relative to the patient.

The collimator 49 is a lead or other material forming a grid of holes. The collimator 49 may be moveable and/or configurable, such as by moving plates. In other embodiments, the collimator 49 is fixed relative to the detector 48.

The SPECT system 40, using the detector 48 and collimator 49, detects emissions from the patient 41 for measuring uptake or physiological function. The detector 48 detects emissions at an energies range, el, from the patient 41. The energy ranges correspond to energy of the isotope in the patient. For imaging uptake in a patient, the detector 48 detects emissions from the patient. The emissions occur from any location in a finite source (i.e., the patient). The radiotracer in the patient migrates to, connects with, or otherwise concentrates at specific types of tissue or locations associated with specific biochemical reactions. As a result, a greater number of emissions occur from locations of that type of tissue or reaction.

The detector 48 applies one or more energy thresholds or other process to detect emission energy at a given energy range. The emissions for the energy range are counted.

The detector 48 and collimator 49 may be moveable with respect to the patient 41. The detector 48 and collimator 49 may continuously move or may be positioned at different locations for particular times. Alternatively or additionally, a patient bed moves the patient 41 relative to the detector 48 and collimator 49.

The image processor 42 is a general processor, artificial intelligence processor or accelerator, digital signal processor, graphics processing unit, application specific integrated circuit, field programmable gate array, digital circuit, analog circuit, combinations thereof, or other now known or later developed device for processing emission information and/or applying a machine-learned network. The image processor 42 is a single device, a plurality of devices, or a network. For more than one device, parallel or sequential division of processing may be used. Different devices making up the image processor 42 may perform different functions, such as one processor (e.g., application specific integrated circuit or field programmable gate array) for reconstructing, another for applying the machine-learned model (e.g., control or general processor), and yet another (e.g., graphics processing unit) for generating an image. In one embodiment, the image processor 42 is a control processor or other processor of SPECT system 40. In other embodiments, the image processor 42 is part of a separate workstation or computer.

The image processor 42 operates pursuant to stored instructions to perform various acts described herein, such as acts 32, 34, 36, and 38 of the method of FIG. 3. The image processor 42 is configured by software, firmware, and/or hardware to perform the acts.

The image processor 42 is configured to reconstruct a spatial distribution of the emissions. The SPECT system 40, using the image processor 42 or another processor, is configured to reconstruct the imaged volume from the detected data. Any reconstruction may be used to estimate the activity concentration or distribution of the tracer in the patient. The SPECT system 40 accesses the detected emission events from the memory 44, from the detector 48, or buffers to reconstruct. The detected emissions are used to reconstruct the distribution of the radioisotope in three dimensions. Forward and backward projection are used iteratively until a merit function indicates completion of the reconstruction.

The image processor 42 is configured to identify features of noise. The arrangement (e.g., settings and/or characteristics for scanning and/or reconstruction) are used to identify features of the noise resulting from the arrangement. The image processor 42 inputs characteristics of the SPECT system and/or isotope characteristics to the machine-learned network. For example, settings or other characteristics include information for the isotope, the collimator, and the reconstruction. This information is input to a deep machine-learned network, which outputs the features of the noise for that information. The shape, size, intensity, and/or other noise structure is estimated by the machine-learned network.

The image processor 42 is configured to locate noise in the spatial distribution of emissions. The reconstructed representation of the emissions may include noise. The noise is located by searching for intensities matching or similar to the features of noise estimated by the machine-learned network. The voxels or locations associated with noise are found.

The image processor 42 may reduce the noise. By filtering or removing the identified or located noise structures, the noise in the representation may be reduced or eliminated. The filtering may use the noise features to filter without the noise being located.

The image processor 42 generates one or more images based on the reconstruction. The image shows the spatial distribution, such as with a multi-planar reconstruction or a volume rendering. For quantitative SPECT, the image represents accurate measures (e.g., in Bq/ml) of the activity concentration based on emissions from the isotope. Alternatively or additionally, the image shows a quantity or quantities (e.g., alphanumeric) representing the activity concentration or specific uptake values for one or more locations or regions.

The image includes fewer noise artifacts due to the reduction. Alternatively, the noise or signal may be highlighted. The identified locations of noise are used to distinguish the noise from the signal in the image.

The display 46 is a CRT, LCD, plasma screen, projector, printer, or other output device for showing an image. The display 46 displays an image of the reconstructed functional volume, such as showing activity concentration as a function of location. The uptake function of the tissues of the patient is represented in the image. Alternatively or additionally, any quantities derived by the image processor 42 may be displayed, such as uptake values and/or change in uptake value. Other quantities may be determined, such as average uptake value or activity concentration for a region, maximum uptake value, peak uptake value in a predetermined unit volume, variance in activity concentration, or total uptake.

The detected emission events, counts, settings, characteristics, arrangement, noise structure, machine-learned network, locations of noise, image, or other SPECT information are stored in the memory 44. The memory 44 may store data at different stages of processing, such as counts, raw data representing detected events without further processing, filtered or thresholded data prior to reconstruction, forward projections, backward projections, differences, projection operators, transposed operators, a measure of completeness of reconstruction, reconstructed data, filtered reconstruction data, thresholds, results of calculations, an image to be displayed, an already displayed image, or other data. The data is stored in any format.

The memory 44 is a buffer, cache, RAM, removable media, hard drive, magnetic, optical, database, or other now known or later developed memory. The memory 44 is a single device or group of two or more devices. The memory 44 is part of SPECT system 40 or a remote workstation or database, such as a PACS memory.

The memory 44 is additionally or alternatively a non-transitory computer readable storage medium with processing instructions. The memory 44 stores data representing instructions executable by the programmed image processor 42. The instructions for implementing the processes, methods, and/or techniques discussed herein are provided on non-transitory computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for denoising in a single photon emission computed tomography (SPECT) system, the method comprising:

detecting, by the SPECT system configured with first settings of variables to configure the SPECT system to perform the detecting, emissions from a patient;

reconstructing, with second settings of variables to configure the reconstructing, a representation in object space from the emissions;

determining, by input of the first settings of the variables to configure the SPECT system to perform the detecting and/or second settings of the variables to configured the reconstructing to a machine-learned model, a noise structure, the noise structure output by the machine-learned model in response to the input;

reducing noise in the representation using the noise structure; and generating an image of the noise-reduced representation.

2. The method of claim 1 wherein detecting comprises detecting with the first settings being for a collimator, isotope, scan protocol, and type of SPECT system, wherein reconstructing comprises reconstructing with the second settings being for type of reconstruction, model, and compensation technique, and wherein determining comprises determining by input of the first and second settings to the machine-learned model.

3. The method of claim 1 wherein reconstructing comprises iterative reconstruction, and the second settings comprises a number of iterations or a stop criterion.

4. The method of claim 1 wherein determining comprises determining by the machine-learned model having been trained with deep learning.

5. The method of claim 1 wherein determining comprises determining the noise structure as a parameterization of size, shape, and/or intensity of noise.

6. The method of claim 1 wherein determining comprises determining the noise structure as values of a noise model.

7. The method of claim 1 wherein reducing the noise comprises identifying the noise by similarity to the noise structure and reducing or eliminating the identified noise.

8. The method of claim 1 wherein reducing the noise comprises filtering with filter parameters set based on the noise structure.

9. The method of claim 1 wherein generating the image comprises generating a quantitative SPECT image of a quantity representing activity concentration.

10. A single photon emission computed tomography (SPECT) system, the SPECT system comprising:

a detector for detecting emissions from an isotope in a patient;

an image processor configured to reconstruct a spatial distribution of the emissions, identify features of noise from a deep machine-learned network, the features of the noise comprising a shape, size, and/or intensity structure as a parameterization, and locate noise in the spatial distribution of emissions using the features of noise from the deep machine-learned network; and a display configured to display an image from the spatial distribution of the emissions, the image being a function of the located noise.

11. The SPECT system of claim 10 further comprising a collimator adjacent to the detector, and wherein the image processor is configured to identify the features of the noise from information for the isotope, the collimator, and the reconstruction, the information input to the deep machine-learned network.

12. The SPECT system of claim 10 wherein the image processor is further configured to reduce the located noise, and wherein the image is a quantitative SPECT image of the spatial distribution of the emissions with the located noise being reduced.

13. The SPECT system of claim 10 wherein the image processor is configured to identify the features of the noise by input of characteristics of the SPECT system and/or isotope characteristics to the machine-learned network.

14. A method for deep learning for denoising in quantitative single photon emission computed tomography (SPECT) imaging, the method comprising:

generating training data of samples of different arrangements of settings of variables configuring for performing SPECT imaging, the training data including the settings of the variables and noise shapes;

machine training with deep learning a network to output noise shape information from input of the arrangements of the settings of the variables configuring for performing the SPECT imaging; and storing the machine-learned network.

15. The method of claim 14 wherein generating comprises generating by SPECT imaging of phantoms and/or physics simulation.

16. The method of claim 14 wherein generating comprises generating with the different arrangements comprising different settings for variables of isotopes, collimator characteristics, types of SPECT systems, scan protocols, reconstruction approaches, reconstruction models, and/or reconstruction compensations.

17. The method of claim 14 wherein machine training comprises machine training the network to output a shape, size, and/or intensity of noise as the noise shape information.

18. The method of claim 14 further comprising denoising a reconstruction for a patient based on the noise shape information output by the machine-learned network in response to input of a patient scan arrangement for the SPECT imaging of the patient.

* * * * *